US009988936B2

(12) United States Patent
Nasr et al.

(10) Patent No.: US 9,988,936 B2
(45) Date of Patent: Jun. 5, 2018

(54) SHROUD ASSEMBLY FOR A GAS TURBINE ENGINE

(71) Applicant: General Electric Company, Schenectady, NY (US)

(72) Inventors: Hojjat Nasr, West Chester, OH (US); Gregory Michael Laskowski, Rowley, MA (US); Curtis Walton Stover, Mason, OH (US); William Collins Vining, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 14/884,152

(22) Filed: Oct. 15, 2015

(65) Prior Publication Data
US 2017/0107852 A1   Apr. 20, 2017

(51) Int. Cl.
*F01D 25/14* (2006.01)
*F01D 9/04* (2006.01)
(Continued)

(52) U.S. Cl.
CPC .............. *F01D 25/14* (2013.01); *F01D 9/04* (2013.01); *F01D 11/24* (2013.01); *F01D 25/12* (2013.01);
(Continued)

(58) Field of Classification Search
CPC .......... F01D 25/12; F01D 25/14; F01D 25/28; F01D 9/04; F01D 11/08; F02D 7/12; F05D 2260/201
See application file for complete search history.

(56) References Cited

U.S. PATENT DOCUMENTS 2,806,551 A   9/1957   Heinrich
3,064,411 A   11/1962  Breslove, Jr.
(Continued)

FOREIGN PATENT DOCUMENTS

EP   0162441 A2   11/1985
EP   0227577 A2   7/1987
(Continued)

OTHER PUBLICATIONS

Poplawski et al., "Microscopic Particle Separation and Applications", Aerospace Research Laboratories, 20 Years of Research Progress, Accession No. AD0667557, Project No. 7116, pp. 1-67, Feb. 1968.
(Continued)

*Primary Examiner* — Dwayne J White
*Assistant Examiner* — Justin A Pruitt
(74) *Attorney, Agent, or Firm* — General Electric Company; William Scott Andes

(57) ABSTRACT

A shroud assembly for a gas turbine engine includes a shroud, hanger, and a hanger support mounted adjacent to a plurality of blades. The hanger can have an interior chamber defining a cooling circuit with a particle separator located within the interior chamber. The particle separator can have an inlet for accepting a flow of cooling fluid, such that a the flow of cooling fluid separates into a major flow and a minor flow carrying particles or particulate matter along the minor flow into a particle collector comprising at least a portion of the particle separator. Particles become constrained to the minor flow and pass into the particle collector, while the major flow is separated into the remaining area of the interior chamber to remove the particles from the flow of cooling fluid passing into the interior chamber.

23 Claims, 5 Drawing Sheets

(51) Int. Cl.
    *F01D 25/32* (2006.01)
    *F01D 25/12* (2006.01)
    *F01D 25/28* (2006.01)
    *F02C 7/12* (2006.01)
    *F01D 11/24* (2006.01)

(52) U.S. Cl.
    CPC .............. *F01D 25/28* (2013.01); *F01D 25/32* (2013.01); *F02C 7/12* (2013.01); *F05D 2240/11* (2013.01); *F05D 2260/607* (2013.01); *Y02T 50/675* (2013.01)

(56) References Cited

U.S. PATENT DOCUMENTS

| | | |
|---|---|---|
| 3,274,757 A | 9/1966 | Jacques |
| 3,302,396 A | 2/1967 | Louis |
| 3,309,867 A | 3/1967 | Ehrich |
| 3,421,299 A | 1/1969 | Poplawski |
| 3,993,463 A | 11/1976 | Barr |
| 4,378,234 A | 3/1983 | Suzuki et al. |
| 4,469,497 A | 9/1984 | Linhardt |
| 4,527,387 A | 7/1985 | Lastrina et al. |
| 4,650,578 A | 3/1987 | Cerdan et al. |
| 4,685,942 A | 8/1987 | Klassen et al. |
| 4,820,122 A | 4/1989 | Hall et al. |
| 4,820,123 A | 4/1989 | Hall |
| 4,992,025 A | 2/1991 | Stroud et al. |
| 5,062,768 A | 11/1991 | Marriage |
| 5,135,354 A | 8/1992 | Novotny |
| 5,193,975 A | 3/1993 | Bird et al. |
| 5,279,109 A | 1/1994 | Liu et al. |
| 5,348,571 A | 9/1994 | Weber |
| 5,498,273 A | 3/1996 | Mann |
| 5,538,394 A | 7/1996 | Inomata |
| 5,558,496 A | 9/1996 | Woodmansee et al. |
| 5,700,131 A | 12/1997 | Hall et al. |
| 5,788,741 A * | 8/1998 | Burton ................ B01D 45/06 95/32 |
| 5,827,043 A | 10/1998 | Fukuda et al. |
| 5,857,833 A | 1/1999 | Dev |
| 5,918,458 A | 7/1999 | Coffinberry et al. |
| 5,951,250 A | 9/1999 | Suenaga et al. |
| 6,033,181 A | 3/2000 | Endres et al. |
| 6,039,537 A | 3/2000 | Scheurlen |
| 6,151,881 A | 11/2000 | Al et al. |
| 6,164,913 A | 12/2000 | Reddy |
| 6,238,183 B1 | 5/2001 | Williamson et al. |
| 6,238,459 B1 | 5/2001 | Downs |
| 6,261,053 B1 | 7/2001 | Anderson et al. |
| 6,264,428 B1 | 7/2001 | Dailey et al. |
| 6,277,278 B1 | 8/2001 | Conrad et al. |
| 6,318,960 B1 | 11/2001 | Kuwabara et al. |
| 6,318,963 B1 | 11/2001 | Emery et al. |
| 6,368,060 B1 | 4/2002 | Fehrenbach et al. |
| 6,382,906 B1 | 5/2002 | Brassfield et al. |
| 6,413,044 B1 | 7/2002 | Roeloffs et al. |
| 6,527,829 B1 | 3/2003 | Malkamaeki et al. |
| 6,673,133 B2 | 1/2004 | Sechrist et al. |
| 6,698,180 B2 | 3/2004 | Snyder |
| 6,840,737 B2 | 1/2005 | Flatman |
| 6,875,256 B2 | 4/2005 | Gillingham et al. |
| 6,910,370 B2 | 6/2005 | Clark et al. |
| 6,969,237 B2 | 11/2005 | Hudson |
| 7,048,501 B2 | 5/2006 | Katayama et al. |
| 7,052,532 B1 | 5/2006 | Liu et al. |
| 7,080,972 B2 | 7/2006 | Rawlinson |
| 7,097,419 B2 | 8/2006 | Lee et al. |
| 7,128,533 B2 | 10/2006 | Liang |
| 7,137,777 B2 | 11/2006 | Fried et al. |
| 7,244,101 B2 | 7/2007 | Lee et al. |
| 7,284,953 B2 | 10/2007 | Silverman et al. |
| 7,540,712 B1 | 6/2009 | Liang |
| 7,563,073 B1 | 7/2009 | Liang |
| 7,572,102 B1 | 8/2009 | Liang |
| 7,581,397 B2 | 9/2009 | Strangman et al. |
| 7,582,145 B2 | 9/2009 | Krigmont |
| 7,645,122 B1 | 1/2010 | Liang |
| 7,665,965 B1 | 2/2010 | Liang |
| 7,770,375 B2 | 8/2010 | Alvanos et al. |
| 7,874,158 B2 | 1/2011 | O'Neill et al. |
| 7,879,123 B2 | 2/2011 | Lundquist et al. |
| 7,921,654 B1 | 4/2011 | Liang |
| 7,922,784 B2 | 4/2011 | Saeed et al. |
| 7,934,906 B2 | 5/2011 | Gu et al. |
| 7,955,053 B1 | 6/2011 | Liang |
| 7,976,277 B2 | 7/2011 | Kopmels et al. |
| 8,092,145 B2 | 1/2012 | Martel et al. |
| 8,104,362 B2 | 1/2012 | McFarland et al. |
| 8,142,153 B1 | 3/2012 | Liang |
| 8,348,614 B2 | 1/2013 | Piggush et al. |
| 8,573,034 B2 | 11/2013 | Grant et al. |
| 8,626,467 B2 | 1/2014 | Fang |
| 8,672,629 B2 | 3/2014 | Botrel et al. |
| 8,733,185 B2 | 5/2014 | Solomon |
| 8,746,464 B2 | 6/2014 | Maier |
| 2002/0166200 A1 | 11/2002 | Conrad et al. |
| 2002/0182062 A1 | 12/2002 | Scimone |
| 2004/0197191 A1 | 10/2004 | Cunha et al. |
| 2004/0221720 A1 * | 11/2004 | Anderson .............. B01D 45/02 95/272 |
| 2005/0118024 A1 | 6/2005 | Anguisola et al. |
| 2005/0129508 A1 | 6/2005 | Fried et al. |
| 2005/0214118 A1 | 9/2005 | Dodd |
| 2006/0073015 A1 | 4/2006 | Liang |
| 2006/0133923 A1 | 6/2006 | Paauwe et al. |
| 2006/0275118 A1 | 12/2006 | Lee |
| 2007/0048122 A1 | 3/2007 | Van et al. |
| 2007/0140848 A1 | 6/2007 | Charbonneau et al. |
| 2008/0041064 A1 | 2/2008 | Moore et al. |
| 2008/0310951 A1 | 12/2008 | Bremer |
| 2009/0060715 A1 | 3/2009 | Kopmels |
| 2009/0081024 A1 | 3/2009 | Tibbott |
| 2009/0126337 A1 | 5/2009 | Hazzard et al. |
| 2009/0155088 A1 | 6/2009 | Lee et al. |
| 2009/0202337 A1 | 8/2009 | Bosley et al. |
| 2009/0214329 A1 | 8/2009 | Joe et al. |
| 2009/0255230 A1 | 10/2009 | Mildner |
| 2009/0261208 A1 | 10/2009 | Belyew |
| 2010/0021308 A1 | 1/2010 | Rawlinson |
| 2010/0024370 A1 | 2/2010 | Jones et al. |
| 2010/0040480 A1 | 2/2010 | Webster et al. |
| 2010/0119377 A1 | 5/2010 | Tibbott et al. |
| 2010/0162682 A1 | 7/2010 | Lerg |
| 2010/0172762 A1 | 7/2010 | Rawlinson |
| 2010/0239409 A1 | 9/2010 | Draper |
| 2010/0247321 A1 | 9/2010 | Kulkarni et al. |
| 2010/0254801 A1 | 10/2010 | Tibbott |
| 2011/0016838 A1 | 1/2011 | Smithies et al. |
| 2011/0047959 A1 | 3/2011 | DiBenedetto |
| 2011/0067378 A1 | 3/2011 | Tibbott et al. |
| 2011/0067409 A1 | 3/2011 | Beeck |
| 2011/0229306 A1 * | 9/2011 | Lewis ................ F01D 11/24 415/115 |
| 2011/0236188 A1 | 9/2011 | Knapp et al. |
| 2011/0247345 A1 | 10/2011 | Laurello et al. |
| 2011/0247347 A1 | 10/2011 | Ebert et al. |
| 2012/0070308 A1 | 3/2012 | Naik et al. |
| 2012/0207594 A1 | 8/2012 | Chanez et al. |
| 2012/0233973 A1 | 9/2012 | Sedillo |
| 2013/0192257 A1 | 8/2013 | Horine et al. |
| 2013/0223987 A1 | 8/2013 | Stafford et al. |
| 2014/0083116 A1 | 3/2014 | Crites et al. |
| 2014/0196437 A1 | 7/2014 | Schneider |
| 2014/0290254 A1 | 10/2014 | Manning et al. |
| 2015/0345331 A1 | 12/2015 | Murray et al. |
| 2016/0045923 A1 | 2/2016 | Correia et al. |
| 2016/0123154 A1 | 5/2016 | Manning et al. |
| 2016/0123227 A1 | 5/2016 | Murray et al. |
| 2017/0101896 A1 | 4/2017 | Manning et al. |

(56) References Cited

U.S. PATENT DOCUMENTS

2017/0107834 A1 4/2017 Nasr et al.
2017/0114720 A1 4/2017 Stone et al.

FOREIGN PATENT DOCUMENTS

| | | |
|---|---|---|
| EP | 0340149 A1 | 11/1989 |
| EP | 0690202 A2 | 1/1996 |
| EP | 0924408 A2 | 6/1999 |
| EP | 1267037 A2 | 12/2002 |
| EP | 2405985 A2 | 1/2012 |
| EP | 2549078 A1 | 1/2013 |
| EP | 2927428 A1 | 10/2015 |
| GB | 711304 A | 6/1954 |
| GB | 1070458 A | 6/1967 |
| GB | 1146262 A | 3/1969 |
| GB | 1412780 A | 11/1975 |
| GB | 2270481 A | 3/1994 |
| WO | 2011006262 A1 | 1/2011 |

OTHER PUBLICATIONS

Walsh et al., "Effects of Sand Ingestion on the Blockage of Film-Cooling Holes", Proceedings of GT2006, ASME Turbo Expo 2006: Power for Land, Sea and Air, Barcelona, Spain, vol. No. 3, pp. 81-90, May 8-11, 2006.

Sennett, "Air Filtration: Perfect Air Filtering for Gas Turbines," Filtration & Separation, vol. 44, Issue. 10, pp. 20-22, Dec. 2007.

Musgrove et al., "Computational Design of a Louver Particle Separator for Gas Turbine Engines", Proceedings of ASME Turbo Expo 2009: Power for Land, Sea and Air, GT2009, Orlando, Florida, USA, vol. No. 3, pp. 1313-1323, Jun. 8-12, 2009.

Cardwell et al., "Investigation of Sand Blocking Within Impingement and Film-Cooling Holes", Journal of Turbomachinery, Transactions of the ASME, vol. No. 132, Issue No. 2, pp. 021020-1-021020-10, Apr. 2010.

Filippone et al., "Turboshaft Engine Air Particle Separation", Progress in Aerospace Sciences, vol. No. 46, Issue No. 5-6, pp. 224-245, Jul.-Aug. 2010.

Lawson et al., "Simulations of Multiphase Particle Deposition on Endwall Film-Cooling Holes in Transverse Trenches", Journal of Turbomachinery, Transactions of the ASME, vol. No. 134, pp. 051040-1-051040-10, Sep. 2012.

Lawson et al., "Simulations of Multiphase Particle Deposition on a Showerhead With Staggered Film-Cooling Holes", Journal of Turbomachinery, Transactions of the ASME, vol. No. 134, pp. 051041-1-051041-12, Sep. 2012.

A European Search Report and Opinion issued in connection with related EP Application No. 15169688.7 dated Oct. 27, 2015.

A PCT Invitation to Pay Additional Fees issued in connection with related PCT Application No. PCT/US2015/033108 dated Mar. 1, 2016.

A European Search Report and Opinion issued in connection with related EP Application No. 15190287.1 dated Mar. 4, 2016.

A PCT Search Report and Written Opinion issued in connection with related PCT Application No. PCT/US2015/032855 dated Mar. 14, 2016.

A European Search Report and Opinion issued in connection with related EP Application No. 15191609.5 dated Mar. 18, 2016.

A Canadian Office Action issued in connection with related CA Application No. 2892519 dated Jun. 21, 2016.

A PCT Search Report and Written Opinion issued in connection with related PCT Application No. PCT/US2015/033108 dated Jul. 12, 2016.

A PCT International Preliminary Report on Patentability issued in connection with Related PCT Application No. PCT/US2015/033108 dated Nov. 29, 2016.

A PCT International Preliminary Report on Patentability issued in connection with corresponding PCT Application No. PCT/US2015/032855 dated Nov. 29, 2016.

A European Search Report and Opinion issued in connection with related EP Application No. 16193374.2 dated Feb. 16, 2017.

A European Search Report and Opinion issued in connection with corresponding EP Application No. 16193576.2 dated Mar. 21, 2017.

A US Non-Final Office Action issued in connection with Related U.S. Appl. No. 14/715,700 dated Apr. 5, 2017.

U.S. Appl. No. 62/004,710, filed May 29, 2014.
U.S. Appl. No. 62/004,728, filed May 29, 2014.
U.S. Appl. No. 62/004,764, filed May 29, 2014.
U.S. Appl. No. 62/004,768, filed May 29, 2014.
U.S. Appl. No. 15/210,783, filed Jul. 14, 2016.

Starkweather, et al., Centrifugal Separator, GE co-pending U.S. Appl. No. 62/004,736, filed May 29, 2014.

Laskowski, et al., Turbine Engine, GE co-pending U.S. Appl. No. 62/004,763, filed May 29, 2014.

Murray, et al., Shroud assembly for turbine engine, GE co-pending U.S. Appl. No. 62/004,766, filed May 29, 2014.

Manning, et al., Inertial Separator, GE co-pending U.S. Appl. No. 62/004,721, filed May 29, 2014.

Correia, et al., Engine Component For a Turbine Engine, GE co-pending U.S. Appl. No. 62/073,525, filed Oct. 31, 2014.

Murray, et al., Separator Assembly for a Gas Turbine Engine, GE co-pending U.S. Appl. No. 62/073,514, filed Oct. 31, 2014.

Buhler, et al., Assembly for a gas turbine engine, GE co-pending U.S. Appl. No. 62/073,538, filed Oct. 31, 2014.

* cited by examiner

SHROUD ASSEMBLY FOR A GAS TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is about 500° C. to 700° C. While the compressor air is a high temperature, it is cooler relative to the turbine air, and can be used to cool the turbine. When cooling the turbines, cooling air can be supplied to various turbine components, including the interior of the turbine blades and the turbine shroud.

Particles, such as dirt, dust, sand, volcanic ash, and other environmental contaminants, in the cooling air can cause a loss of cooling and reduced operational time or "time-on-wing" for the aircraft environment. This problem is exacerbated in certain operating environments around the globe where turbine engines are exposed to significant amounts of airborne particles. Particles supplied to the turbine components can clog, obstruct, or coat the flow passages and surfaces of the components, which can reduce the lifespan of the components.

BRIEF DESCRIPTION OF THE INVENTION

A shroud assembly for a turbine engine having a compressor, a combustor, and a turbine within a casing, with the turbine having a plurality of annularly-arranged fixed vanes defining a nozzle and a plurality of annularly-arranged rotating blades paired with the fixed vanes to define one stage of the turbine. The shroud assembly comprises: a shroud having a front side confronting the blades and a back side opposite the front side; a hanger configured to couple the shroud with the casing and defining an interior chamber, and having a fore face with an inlet passage extending through the fore face and fluidly coupled to the chamber, and an aft face with an outlet passage extending through the aft face and fluidly coupled to the chamber; a cooling circuit having a first portion fluidly coupled to the inlet passage and supplying a cooling fluid stream to the chamber through the inlet passage and a second portion fluidly coupled to the outlet passage and defining a scavenge flow passage; and at least one particle separator located within the chamber and having a scavenge flow inlet spaced from and confronting the inlet passage to define a gap between the scavenge flow inlet and the inlet passage, a scavenge conduit fluidly coupled to the scavenge flow passage, and a choke fluidly coupling the scavenge flow inlet to the scavenge conduit. The gap is sized such that a portion of the cooling fluid stream flows out through the gap, and the inlet passage is aligned with the scavenge inlet such that a second portion of the cooling fluid stream flows directly from the inlet passage, across the gap, and into the scavenge inlet, with particles entrained in the cooling fluid stream are primarily constrained by momentum in the second portion of the cooling fluid stream to define a scavenge fluid stream.

A component for a turbine engine having a compressor, a combustor, and a turbine within a casing, with the turbine having a plurality of annularly arranged fixed vanes defining a nozzle and a plurality of annularly-arranged rotating blades paired with the fixed vanes to define one stage of the turbine. The component comprises: a body defining an interior chamber, and having a first face with an inlet passage extending through the first face and fluidly coupled to the chamber, and a second face with an outlet passage extending through the second face and fluidly coupled to the chamber; a cooling circuit having a first portion fluidly coupled to the inlet passage and supplying a cooling fluid stream to the chamber through the inlet passage and a second portion fluidly coupled to the outlet passage and defining a scavenge flow passage; and at least one particle separator located within the chamber and having a scavenge flow inlet spaced from and confronting the inlet passage to define a gap between the scavenge flow inlet and the inlet passage, a scavenge conduit fluidly coupled to the scavenge flow passage, and a choke fluidly coupling the scavenge flow inlet to the scavenge conduit. The gap is sized such that a first portion of the cooling fluid stream flows out through the gap, and the inlet passage is aligned with the scavenge inlet such that a second portion of the cooling fluid stream flows directly from the inlet passage, across the gap, and into the scavenge inlet, with particles entrained in the cooling fluid stream are primarily constrained by momentum in the second portion of the cooling fluid stream to define a scavenge fluid stream.

A shroud assembly for a turbine engine having a compressor, a combustor, and a turbine comprising a shroud confronting a plurality of annularly-rotating blades, a hanger coupled to the shroud defining an interior chamber having an inlet and a scavenge flow outlet, a virtual impactor located within the interior chamber. A cooling fluid stream is introduced into the interior chamber through the inlet and the virtual impactor separates the cooling fluid stream into a scavenge particle fluid stream flowing through the virtual impactor and exhausted out through the scavenge flow outlet, and a reduced particle fluid stream flowing exteriorly of the virtual impactor within the interior chamber.

DESCRIPTION OF EMBODIMENTS OF THE INVENTION

The described embodiments of the present invention are directed to a turbine blade, and in particular to cooling a turbine blade. For purposes of illustration, the present invention will be described with respect to a turbine blade for an aircraft gas turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

Figure 1:
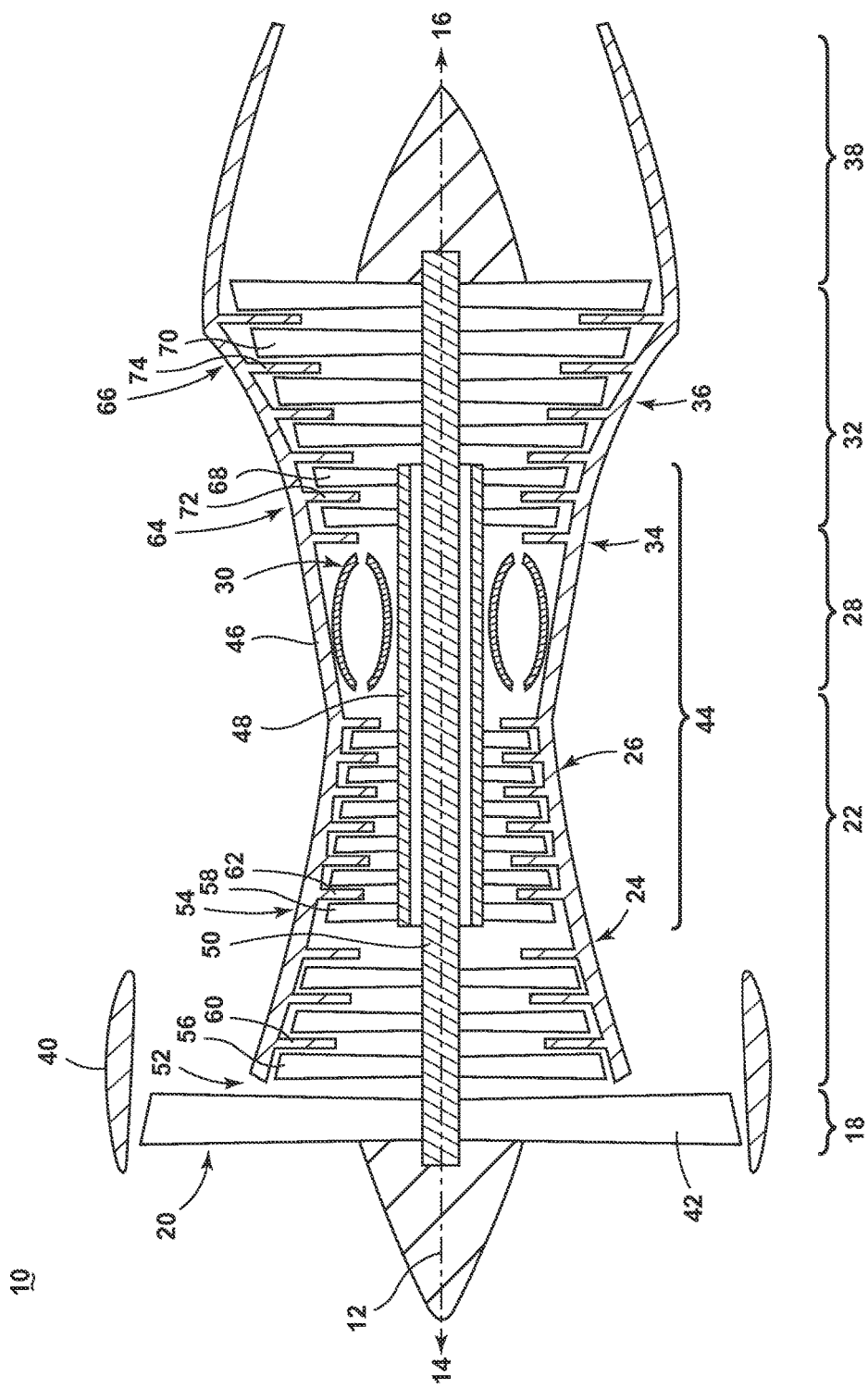
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
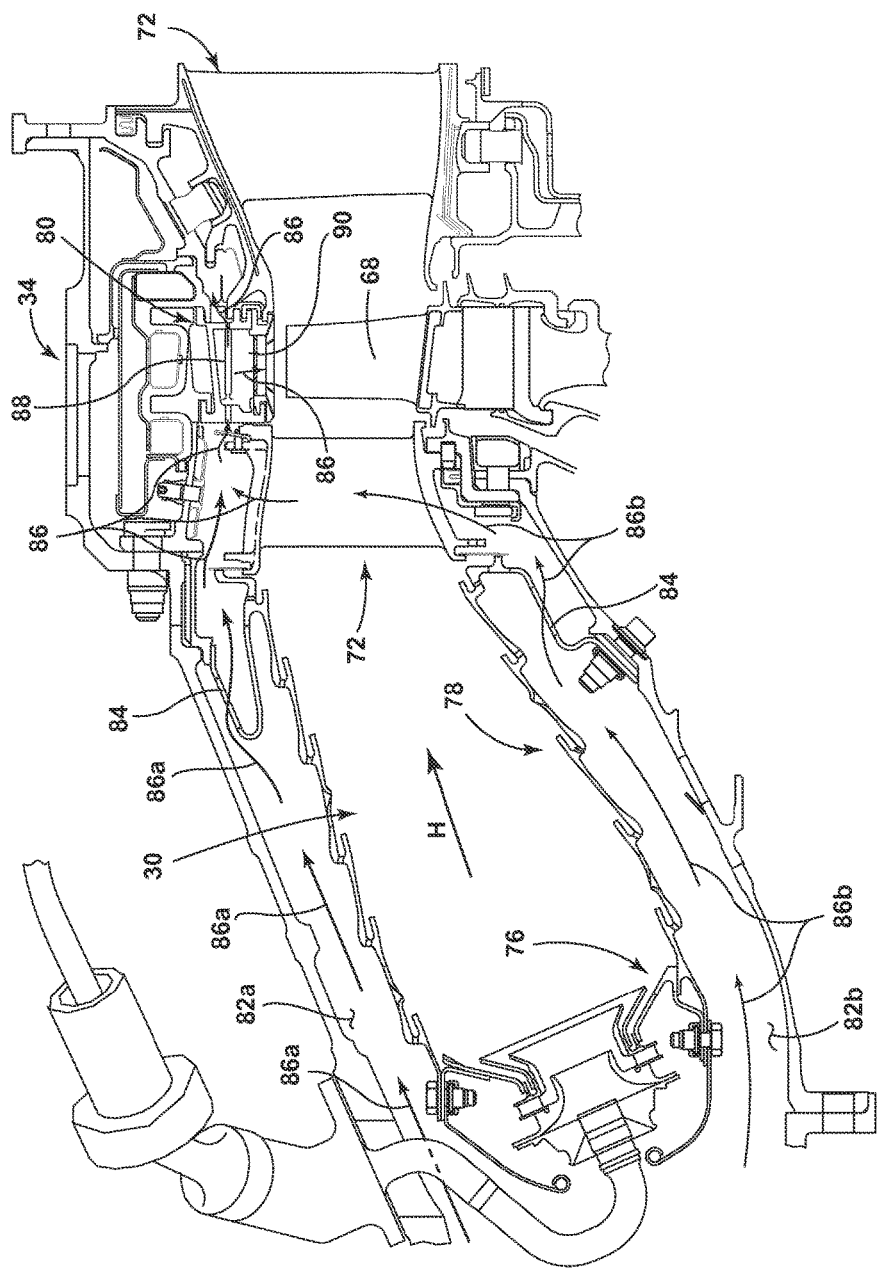
FIG. 2 is a side section view of a combustor and high pressure turbine of the engine from FIG. 1.

FIG. 2 is a side section view of the combustor 30 and HP turbine 34 of the engine 10 from FIG. 1. The combustor 30 includes a deflector 76 and a combustor liner 78. Adjacent to the turbine blade 68 of the turbine 34 in the axial direction are sets of radially-spaced, static turbine vanes 72, with adjacent vanes 72 forming nozzles therebetween. The nozzles turn combustion gas to better flow into the rotating blades so that the maximum energy can be extracted by the turbine 34. A cooling fluid flow C passes through the vanes 72 to cool the vanes 72 as hot combustion gas H passes along the exterior of the vanes 72. A shroud assembly 80 is adjacent to the rotating blade 68 to minimize flow loss in the turbine 34 and to define the annular hot gas flow path. Similar shroud assemblies can also be associated with the LP turbine 36, the LP compressor 24, or the HP compressor 26.

A set of bypass channels comprising a first bypass channel 82a and a second bypass channel 82b are disposed adjacent to the combustor 30 on the radial top and bottom of the combustor 30, respectively. Each bypass channel 82a, 82b comprises an opening 84 fluidly coupling the compressor section 22 to the turbine section 32. Arrows 86 illustrate a flow of cooling fluid through the bypass channels. The first flow 86a passes through the first bypass channel 82a, and a second flow 86b can pass through the second bypass channel 82b and can pass into the shroud assembly 80. The first bypass channel 82a can feed a flow of cooling fluid directly to the shroud assembly 80 while the second bypass channel 82b can feed a cooling fluid to the shroud assembly 80 through the interior of the vane 72. The fluid passing through at least one of the bypass channels 82a, 82b, the opening 84, and the vane 72 and into the shroud assembly 80 can comprise a first portion of a cooling circuit.

The cooling fluid enters the shroud assembly 80 and passes through a particle separator 88. The cooling fluid passes through the particle separate 88 and exits the shroud assembly 80, defining a second portion of the cooling circuit. Additionally, the shroud assembly 80 can include an impingement baffle 90, such that the cooling fluid within the shroud assembly 80 can pass through the impingement baffle 90 and through a cooling fluid outlet to define a third portion of a cooling circuit.

It should be appreciated that first, second, and third portions of the cooling circuit as illustrated are exemplary, facilitating understanding of the inventive concepts disclosed herein. It should be understood that the first portion of the cooling circuit could vary from as described, such that a cooling fluid is fed into the shroud assembly 80. Similarly, the second portion cooling circuit can vary such that a cooling fluid is exhausted from the shroud assembly 80. Finally, the third portion of the cooling circuit is exemplary and optional, such that a portion of the cooling fluid could be exhausted form the shroud assembly 80 at a location different from the second portion.

Figure 3:
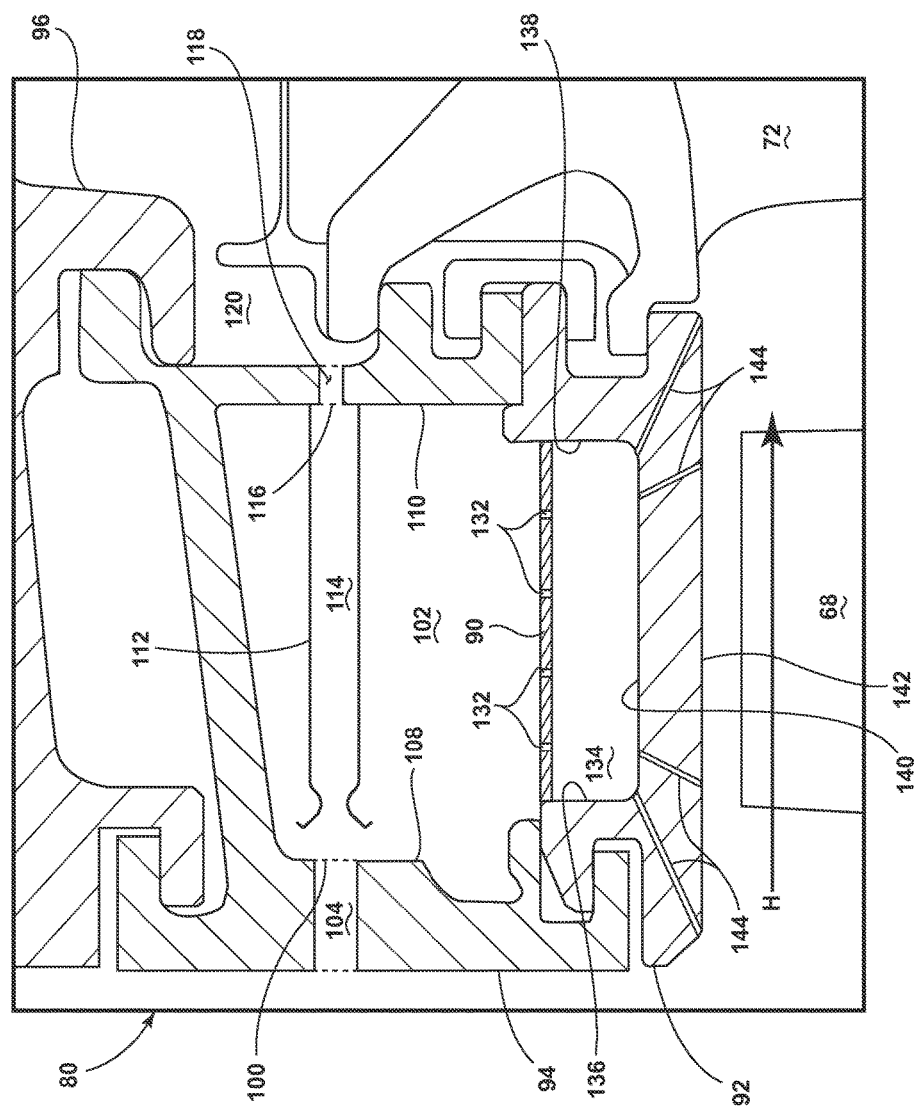
FIG. 3 is a schematic sectional view of a shroud assembly of the engine of FIG. 1 with a particle separator.

FIG. 3 is a schematic view showing the shroud assembly 80 of FIG. 2, which can be cooled by a flow of cooling fluid. The shroud assembly 80 is exemplary, shown as being associated with a blade 68 of the HP turbine 34, while the shroud assembly 80 can alternatively be associated with the LP turbine 36, the LP compressor 24, or the HP compressor 26.

The shroud assembly 80 includes a shroud 92 spaced radially about the blades 68 and a hanger 94 configured to couple the shroud 92 with a casing of the engine 10 and retain the shroud 92 in position, adjacent to the blade 68. The hanger 94 can directly mount the shroud 92 with the core casing 46 via a hanger support 96. The shroud 92 and hanger 94 extend circumferentially, and the engine 10 of FIG. 1 and can include multiple shroud assemblies 80 extending around the circumference defined by the blades 68.

The hanger 94 further defines a body having a fluid inlet 100 providing fluid communication between the exterior of the hanger 94 and with an interior chamber 102 through an inlet passage 104. The interior chamber 102 comprises a first face or fore face 108 defining a wall on the fore side of the interior chamber 102 and a second face or aft face 110 defining a wall on the aft side of the interior chamber 102, relative to the hot fluid flow path H through the engine 10. The particle separator 88, which can comprise a virtual impactor 112, is disposed within the interior chamber 102 and mounted to the aft face 110. Alternatively, the virtual impactor 112 can be formed as part of the shroud assembly 80. The virtual impactor 112 comprises a scavenge conduit 114 having an outlet 116. The outlet 116 couples to a scavenge flow passage 118, providing fluid communication between the scavenge conduit 114 and a cavity 120. The cavity 120 is external of and adjacent to the hanger 94, being disposed between the hanger 94 and a nozzle, the vanes 72, or a band, for example.

The impingement baffle 90 can further define the interior chamber 102. A plurality of impingement apertures 132 can define multiple through openings in the impingement baffle 90, fluidly coupling the interior chamber 102 to a space 134 disposed between the shroud 92 and the impingement baffle 90. The shroud 92 can further comprise a shroud fore wall 136 and a shroud aft wall 138, further defining the space 134. The shroud comprises a cooling surface 140 and a hot surface 142 adjacent to the fan blades 68. A plurality of film holes 144 fluidly couple the cooling surface 140 to the hot surface 142.

It should be appreciated that the lengths of the inlet passage 104 and the scavenge conduit 114 are exemplary and can comprise any length. Furthermore, the location of the virtual impactor 112 can be nearer to or further from the inlet passage 104, which can change based upon the respective geometry of the shroud assembly 80 and associated components. Further still, the size of the shroud assembly 80 utilizing the virtual impactor can determine the relative lengths and sizes of the inlet passage 104 and the scavenge conduit 114. The geometry of the inlet 104, the scavenge conduit 114, and elements comprising the virtual impactor 112 can be alternate as well, such as comprising a cylinder, a slot, an increasing or decreasing cross-section, or otherwise, in non-limiting examples.

It should be further appreciated that while the inlet passage 104 and the scavenge conduit 114 are laterally aligned they can alternatively be offset. For example, a longitudinal axis through the inlet passage 104 and a separate longitudinal axis through the virtual impactor 112 can be offset such that a lateral misalignment exists between the two. Furthermore, longitudinal axes of the inlet passage 104 and the virtual impactor 112 can be offset by an angular deviation, such that the axes can intersect at a point. Such an angular deviation can be no more than twenty degrees in any direction between the axes. Further still, the angular deviation can be combined with the lateral misalignment, such that the axes never intersect, and are angularly and laterally misaligned relative to the engine centerline.

Figure 4:
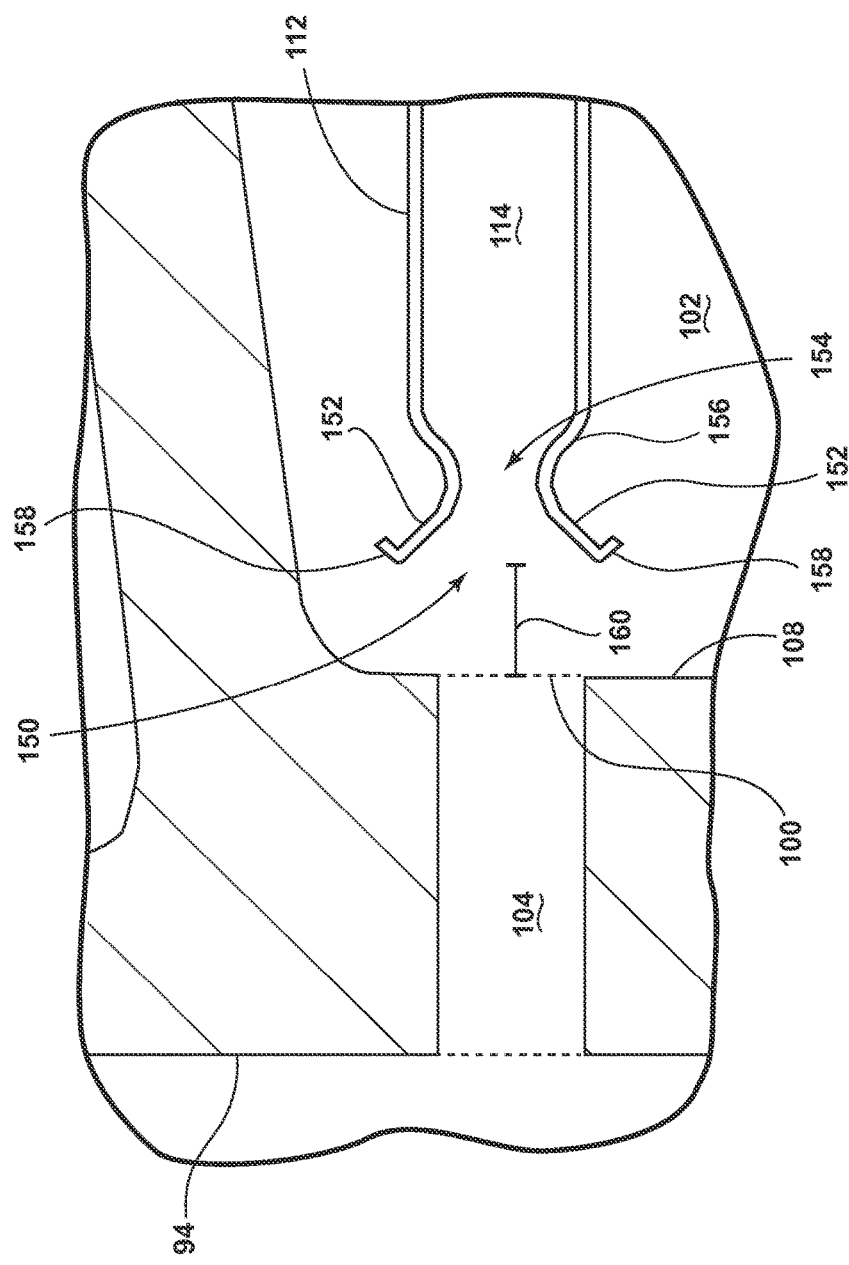
FIG. 4 is a close-up view of the inlet of the particle separator of FIG. 3.

Turning to FIG. 4, the virtual impactor 112 further comprises a scavenge flow inlet 150. The scavenge flow inlet 150 is further comprises by an annular tapered portion defining a converging inlet 152, comprising a reduced cross-sectional area. The annular tapered portion is a nominally circular inlet 152, and should not be understood as annular relative to the engine 10. The converging inlet 152 terminates at a choke 154 comprising the minimum cross-sectional area between the scavenge flow inlet 150 and the scavenge conduit 114. A diverging section 156 can be disposed between the choke 154 and the scavenge conduit 114 such that a flow of cooling fluid is slowed before entering the scavenge conduit 114. The choke 154 represents the minimum cross-sectional area of the converging inlet 152, and is not intended to be understood as a choked flow of cooling fluid. A lip 158 is disposed on the end of the converging inlet 152, opposite of the choke 154. The lip 158 comprises an annular diverging portion moving in the direction of the choke 154, disposed radially outside of the converging inlet 152. The scavenge flow inlet 150 is spaced from the fluid inlet by a gap 160, such that a flow of cooling fluid can flow to both the interior chamber 102 and the scavenge conduit 114 from the inlet passage 104.

It should be appreciated that the geometry of the scavenge flow inlet 150, the converging inlet 152, the choke 154, the gap 160, the lip 158, and the diverging section 156 are exemplary as illustrated. The lengths of each aforementioned element can vary and the linear elements can be curved or angled, such that the elements can comprise a convex or concave dimension. Furthermore, in an additional exemplary virtual impactor, the choke can be disposed at any length along the scavenge flow conduit, such that the choke can be downstream from the inlet or can further define the scavenge flow conduit, or can extend the length of the inlet further into the scavenge flow conduit. The particular geometry annular elements, such as the choke 154 or the flow inlet 150 can comprise an alternate shape as well, such as a cylindrical shape, slot, increasing or decreasing cross-sections, or otherwise in non-limiting examples. Furthermore, the gap 160 can be determine relative to the diameter of the choke 154, such that the gap 160 to choke 154 ratio can be between 1:1 and 1:4 with the ratio preferably being between 1:1 and 1:2.

Figure 5:
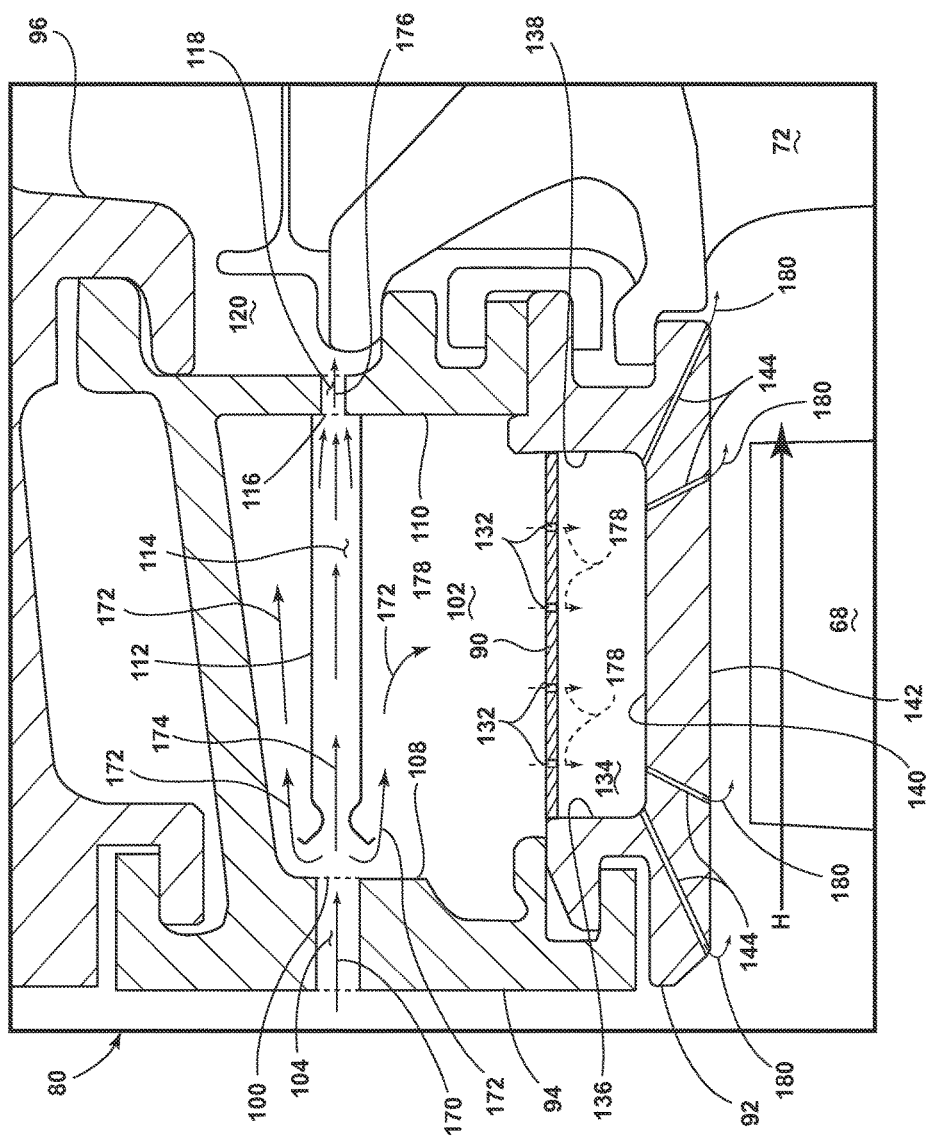
FIG. 5 is the schematic sectional view of the shroud assembly of FIG. 3 illustrating the flow path for a cooling fluid moving through the shroud assembly.

In FIG. 5, a flow of cooling fluid enters the inlet passage 104 as an inlet flow 170. In alternative implementations, the inlet passage 104 can be shaped to accelerate the inlet flow 170, such as having a converging cross-section. Furthermore, the inlet passage 104 can extend into the interior chamber 102, decreasing the length of the gap 160. The inlet flow 170 enters the interior chamber 102 from the fluid inlet 100 and is separated into two flows comprising a major flow 172 and a minor flow 174, which can be determined by a pressure differential between the interior chamber 102 and the scavenge conduit 114 as well as the length of the gap 160. The major flow 174 enters interior chamber 102, which can comprise about 90% of the inlet flow 170 and can spread throughout the interior chamber 102. The minor flow 174, which can comprise about the remaining 10% of the inlet flow 170, enters the scavenge conduit 114. The minor flow 174 moves from the gap 160, through the scavenge conduit 114, and exits at the outlet 116 passing through the scavenge flow passage 118. The flow of cooling fluid extracted through the scavenge flow passage 118 can define a scavenge flow 176 which can be diverted to other portions of the engine, engine components, or the vehicle for separate use. The pressure differential between the interior chamber 102 and the scavenge conduit 114 can maintain the separation of the major and minor flows 174, 176, such as a 90% to 10% ratio of major flow 174 to minor flow 176. Alternatively, the geometry of the virtual impactor 112, the inlet 100, the inlet passage 104, or the pressures maintained within the cooling circuit can be adapted to provide any ratio of major flow 174 to minor flow 176.

Particles or particulate matter, such as dirt, dust, sand, volcanic ash, and other environmental contaminants can become entrained in the flow of cooling fluid external of the engine system, and can travel through the cooling circuit within the engine components. Particles entering the interior chamber 102 from the inlet 100 will have a momentum defined by the mass of the particles and the speed at which the cooling fluid is travelling. The momentum of the particles will carry the particles across the gap 160 and into the scavenge conduit 114. As such, the major flow 172 can further comprise a clean flow, having an amount of particles removed therefrom, and the minor flow 174 can further comprise a dirty flow 174, as an amount of particles extracted from the major flow 172 are constrained to the cooling fluid of the minor flow 174 due to their momentum. The particles constrained within the minor flow 174 can further define a scavenge fluid stream, such that the particles constrained to the minor flow 174 are carried through the scavenge flow passage 118. Particles entering the scavenge conduit 114 can be held within the scavenge conduit 114 for eventual removal, or can be directed through the scavenge flow passage 118 for use in an engine component adequately adapted to handle the particulate matter.

The cleaned, major flow 172, having an amount of particles removed therefrom, can further flow through the interior chamber 102 toward the impingement baffle 90. The major flow 172 of cooling fluid can pass through the impingement apertures 132 in the impingement baffle 90, as an impingement flow 178, to the space 134 between the shroud 92 and the impingement baffle 90, defining the third portion of the cooling circuit. A flow of cooling fluid 180 can flow through the film holes 144 in the shroud 92 to provide a film of cooling fluid along the hot surface 142 of the shroud 92 adjacent to the fan blades 68.

It should be appreciated that the particles collector as oriented is exemplary, and can be oriented in any direction, such as radial, axial, forward, aft, or any combination thereof, relative to the engine centerline, to define at least a portion of a cooling circuit within an engine component. The engine component, illustrated as a vane is also exemplary. Alternative engine components can comprise a hanger bracket or associated elements, or an engine blade comprising an airfoil shape similar to the vane.

It should be further appreciated that the particle separator operates to remove particles from a flow of cooling fluid. The system can be discriminative, removing a majority of particles based upon particle size, mass, or a combination thereof. As such, any particles remaining within the major flow can comprise a size or mass small to pass through remaining portions of the cooling circuit, such as the film holes, reducing associated clogging or damage to the components.

It should be further appreciated that the virtual impactor as described herein is ideal for removing particles from a flow of cooling fluid passing through the vane or engine component. However, different particles separators can be utilized within the system in order to achieve the desired cooling circuit while separating particles from the flow of cooling fluid.

It should be further appreciated that the particle separator operates to remove particles from a flow of cooling fluid. The system can be discriminative, removing a majority of particles based upon particle size, mass, or a combination thereof. As such, any particles remaining within the major flow can comprise a size or mass small to pass through remaining portions of the cooling circuit, such as the film holes or impingement apertures, reducing associated clogging or damage to the components.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shroud assembly for a turbine engine having a compressor, a combustor, and a turbine within a casing, with the turbine having a plurality of annularly-arranged fixed vanes defining a nozzle and a plurality of annularly-arranged rotating blades paired with the fixed vanes to define one stage of the turbine, the shroud assembly comprising:

a shroud having a front side confronting the blades and a back side opposite the front side;

a hanger configured to couple the shroud with the casing and defining an interior chamber, and having a fore face with an inlet passage extending through the fore face and fluidly coupled to the chamber, and an aft face with an outlet passage extending through the aft face and fluidly coupled to the chamber;

a cooling circuit having a first portion fluidly coupled to the inlet passage and supplying a cooling fluid stream to the chamber through the inlet passage and a second portion fluidly coupled to the outlet passage and defining a scavenge flow passage; and at least one particle separator located within the chamber and having a scavenge flow inlet spaced from and confronting the inlet passage to define a gap between the scavenge flow inlet and the inlet passage, a scavenge conduit fluidly coupled to the scavenge flow passage, and a choke fluidly coupling the scavenge flow inlet to the scavenge conduit;

wherein the gap is sized such that a first portion of the cooling fluid stream flows out through the gap, and the inlet passage is aligned with the scavenge inlet such that a second portion of the cooling fluid stream flows directly from the inlet passage, across the gap, and into the scavenge inlet, with particles entrained in the cooling fluid stream are primarily constrained by momentum in the second portion of the cooling fluid stream to define a scavenge fluid stream.

2. The shroud assembly of claim 1 wherein the scavenge flow inlet comprises a reduced cross-sectional area portion to accelerate the first portion of the cooling fluid stream prior to reaching the choke.

3. The shroud assembly of claim 2 wherein the reduced cross-sectional area portion comprises a continuously reducing cross-sectional area in a direction toward the choke.

4. The shroud assembly of claim 1 wherein the scavenge flow inlet comprises a first tapered portion, which reduces in cross-sectional area toward the choke.

5. The shroud assembly of claim 4 wherein the scavenge flow inlet comprises a lip defined by a second tapered portion that increases in cross-sectional area toward the choke.

6. The shroud assembly of claim 5 wherein the second tapered portion extends from the first tapered portion.

7. The shroud assembly of claim 6 wherein the choke comprises a minimum cross-sectional area, which is less than or equal to the smallest cross-sectional area of the scavenge flow inlet and the scavenge conduit.

8. The shroud assembly of claim 7 wherein the scavenge conduit has a constant cross sectional area downstream of the choke.

9. The shroud assembly of claim 1 wherein the hanger further comprises an impingement baffle in fluid communication with the first portion of the cooling fluid stream.

10. The shroud assembly of claim 9 wherein the impingement baffle comprises multiple through openings.

11. The shroud assembly of claim 10 wherein the cooling circuit further comprises a third portion fluidly coupled to the chamber and defining a cooling fluid outlet.

12. The shroud assembly of claim 1 wherein the particle separator comprises a virtual impactor.

13. A component for a turbine engine having a compressor, a combustor, and a turbine within a casing, with the turbine having a plurality of annularly-arranged fixed vanes defining a nozzle and a plurality of annularly-arranged rotating blades paired with the fixed vanes to define one stage of the turbine, the component comprising:
 a body defining an interior chamber, and having a first face with an inlet passage extending through the first face and fluidly coupled to the chamber, and a second face with an outlet passage extending through the second face and fluidly coupled to the chamber;
 a cooling circuit having a first portion fluidly coupled to the inlet passage and supplying a cooling fluid stream to the chamber through the inlet passage and a second portion fluidly coupled to the outlet passage and defining a scavenge flow passage; and
 at least one particle separator located within the chamber and having a scavenge flow inlet spaced from and confronting the inlet passage to define a gap between the scavenge flow inlet and the inlet passage, a scavenge conduit fluidly coupled to the scavenge flow passage, and a choke fluidly coupling the scavenge flow inlet to the scavenge conduit;
 wherein the gap is sized such that a first portion of the cooling fluid stream flows out through the gap, and the inlet passage is aligned with the scavenge inlet such that a second portion of the cooling fluid stream flows directly from the inlet passage, across the gap, and into the scavenge inlet, with particles entrained in the cooling fluid stream are primarily constrained by momentum in the second portion of the cooling fluid stream to define a scavenge fluid stream.

14. The nozzle assembly of claim 13 wherein a ratio of the length of the gap to the diameter of the choke is between 1:1 and 1:4.

15. The nozzle assembly of claim 14 wherein the ratio of the length of the gap to the diameter of the choke is between 1:1 and 1:2.

16. The component of claim 13 wherein the scavenge flow inlet comprises a reduced cross-sectional area portion to accelerate the first portion of the cooling fluid stream prior to reaching the choke.

17. The component of claim 16 wherein the reduced cross-sectional area comprises a continuously reducing cross-sectional area in a direction toward the choke.

18. The component of claim 13 wherein the scavenge flow inlet comprises a first tapered portion, which reduces in cross-sectional area toward the choke.

19. The component of claim 18 wherein the scavenge flow inlet comprises a lip defined by a second tapered portion that increases in cross-sectional area toward the choke.

20. The component of claim 19 wherein the choke comprises a minimum cross-sectional area, which is less than or equal to the smallest cross-sectional area of the scavenge flow inlet and the scavenge conduit.

21. The component of claim 20 wherein the scavenge conduit has a constant cross sectional area downstream of the choke.

22. The component of claim 13 wherein the component comprises at least one of a hanger bracket, shroud, and blade.

23. A shroud assembly for a turbine engine having a compressor, a combustor, and a turbine comprising:
 a shroud confronting a plurality of annularly-rotating blades;
 a hanger coupled to the shroud defining an interior chamber having an inlet and a scavenge flow outlet; and
 a virtual impactor located within the interior chamber;
 wherein a cooling fluid stream is introduced into the interior chamber through the inlet and the virtual impactor separates the cooling fluid stream into a scavenge particle fluid stream flowing through the virtual impactor and exhausted out through the scavenge flow outlet, and a reduced particle fluid stream flowing exteriorly of the virtual impactor within the interior chamber.

* * * * *